H. G. KORINKO & A. J. ASP.
CAMERA ATTACHMENT.
APPLICATION FILED JULY 24, 1908.
933,312.
Patented Sept. 7, 1909.
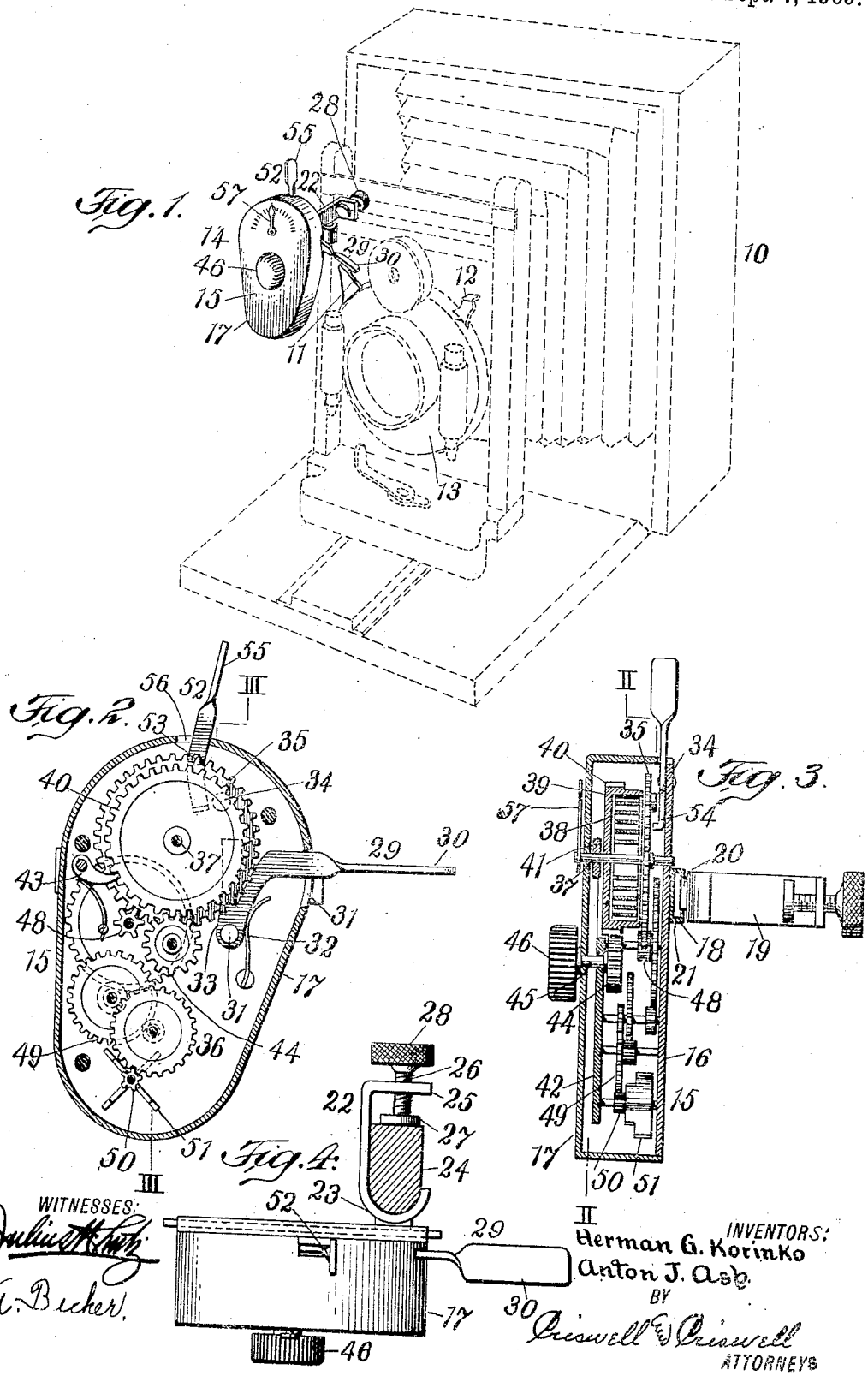
WITNESSES:
INVENTORS:
Herman G. Korinko
Anton J. Asp
BY
Criswell & Criswell
ATTORNEYS

UNITED STATES PATENT OFFICE.

HERMAN G. KORINKO AND ANTON J. ASP, OF NEW YORK, N. Y.

CAMERA ATTACHMENT.

933,312.  Specification of Letters Patent.  Patented Sept. 7, 1909.

Application filed July 24, 1908. Serial No. 445,161.

*To all whom it may concern:*

Be it known that we, HERMAN G. KO-RINKO and ANTON J. ASP, citizens of the United States, and residents of New York, borough of Brooklyn, county of Kings, and State of New York, have invented certain new and useful Improvements in Camera Attachments, of which the following is a full, clear, and exact description.
This invention relates more particularly to an automatic shutter operating device.

The primary object of the invention is to provide a simple and efficient attachment which may be readily applied to cameras of various constructions and so arranged that the shutter may be operated automatically after a given time, according to the construction of the device, to permit one or more persons to be properly posed before the camera at the desired distance therefrom without the necessity for manually operating the shutter as usual, thereby permitting a person to take his own picture, or to pose as a part of a group as is often desirable and which is not convenient with cameras as ordinarily constructed.

A further object of the invention is to provide a simple device which may be readily attached to a part of a camera adjacent to the shutter operating mechanism, and which may be so constructed and regulated as to be quickly adjusted or attached to or removed from the camera, and which can be made to vary the length of time in which it is desired the person shall have to pose before the camera before the shutter is operated.

With these and other objects in view, the invention will be hereinafter more particularly described with reference to the accompanying drawings, which form a part of this specification, and will then be pointed out in the claims at the end of the description.
In the drawings, Figure 1 is a perspective view of one form of device embodying our invention, showing the same as applied to one form of camera. Fig. 2 is a detail sectional view taken on the line II—II of Fig. 3.
Fig. 3 is a vertical section, partly in elevation taken on the line III—III of Fig. 2; and Fig. 4 is a plan view of the device, showing a part of the camera in section to which the device may be attached.
The camera 10 may have the usual operating levers 11 and 12 forming a part of the shutter mechanism 13, and which is adapted to be operated by a bulb or otherwise for time, instantaneous or other exposures, all of which may be of any suitable or preferred construction.

The attachment 14 may have a casing 15 comprising a base or rear member 16 and a cap member or cover 17 which is adapted to be fastened and held to the base member by screws or otherwise. On the rear member 16 of the casing and transversely thereof is arranged a grooved rail or device 18 in which is adapted to move a clamp 19. This clamp 19 is provided with a slide 20 which is adapted to move within the groove formed between the L-shaped flanges 21 of the guide 18, and to said slide is held a clamping member 22. This clamping member 22 has a curved portion 23 adapted to fit about the outer edge of a post 24, or other part of the camera, and is provided with an angularly arranged portion 25 forming substantially a C-shaped clamp. A threaded stem 26 passes through a threaded aperture in the part 25 of the clamp and on the end thereof is arranged a button or engaging part 27 loosely arranged on one end, and on the outer end is a thumb nut or fingering part 28 by which the said clamping member 22 may be held adjustably to a part of the camera and in such a way that the casing 15 may be adjusted along the slide 18 to properly position the attachment with relation to the operating lever 11.

To operate the lever 11 of the camera we arrange a lever 29 so as to have the outer end or arm 30 thereof movable in the path of the lever 11. The lever 29 of the attachment is pivoted at 31 within the casing and to the rear member 16, and has its arm 30 guided and movable in the slot 31 of the member 17 and is normally forced upward by means of a spring 32. This lever 29 has an arm 33 normally extending upward and may have its inner edge curved so as to form an engaging surface for a pin or projection 34 carried by a gear 35 of the operating mechanism 36. This operating mechanism may be of any suitable kind and is arranged within the casing 15. As shown the gear 35 is secured to a shaft 37 and this shaft 37 is connected to one end of a spring 38 which has its other end held to a drum 39, the outer edge of which is provided with teeth forming a gear wheel 40. The drum is loosely mounted on the shaft 37 and said shaft is journaled in the rear member 16 and a bracket 41 of a face plate 42, which is rigidly held to the rear plate 16 in such a way and is of such a form as will properly hold the operating mechanism between said face plate and the rear member 16 to permit the cap piece 17 to be removed at any time without removing or disarranging any of the operating mechanism 36.

The drum 39 is normally held against movement in one direction by a spring pressed pawl or detent 43 which is adapted to engage the teeth of the gear 40, and to rotate the drum to wind the spring 38 is a gear or pinion 44 carried by the shaft 45 on which is a fingering piece or knob 46, so that when the gear 44 is operated it will wind the spring and when the same is released the spring 38 will rotate the shaft 37 and through it the gear 35 so as to cause the pin or projection 34 to move the outer arm 30 of the lever 29 downward at each revolution, and as soon as the pin passes the inner edge of the arm 33 of said lever the spring 32 will restore said lever to the position shown in Fig. 2.

The gear 35 is in mesh with a pinion 48 of a train of gearing 49 the lower pinion 50 of which is connected to operate with a governor wheel 51, as is usual in clock and motor mechanism, so that the speed of rotation of the gear 35 may be properly governed and regulated according to the size and nature of the train of gearing in the usual manner. By this means the time of movement of the lever 29 may be regulated to permit a person to pose himself properly before the lens of the camera or to form a part of a group before the shutter mechanism is operated, and to operate the shutter mechanism entirely automatic.

A lever 52 is pivotally held at 53 to the rear member 16 of the casing, and this lever has one end, as 54, bent or otherwise formed to be moved into or out of the path of movement of the projection 34. This lever has an operating part 55 which projects through a slot 56 in the cap 17 so as to be manually operated, and when moved to the position shown in Fig. 2 will permit the projection to pass by the same allowing the lever 29 to be operated by said projection, but when moved to the opposite end of the slot will engage said pin and stop the mechanism, there being a spring if necessary to normally hold the lever 52 in a position to hold the mechanism 36 against operation. The shaft 37 of the gear 35 carrying the pin or projection 34 may have a pointer or other indicator 57 secured to the outer end thereof so as to show at a glance that the mechanism 36 is operating properly.

From the foregoing it will be seen that a simple and efficient attachment is provided which may be adjustably and removably held to various forms of cameras to adapt the same to automatically operate the shutter mechanism of the camera after a given time; that said attachment has its mechanism so arranged that it is very compact and will not easily get out of order; that said attachment may be made to vary the time the mechanism is to take in operating the shutter mechanism; and that said attachment permits the shutter mechanism to be so operated that a person may pose himself at any desired distance from the camera and either alone or with a group as preferred.

Having thus described our invention, we claim as new and desire to secure by Letters Patent:—

1. A camera attachment comprising a casing, a lever mounted therein and adapted to engage shutter operating mechanism, said lever being provided with an angular arm or projection, means within said casing constructed to engage said arm or projection to temporarily shift said lever in a direction to actuate said shutter operating mechanism.

2. A camera attachment comprising a casing, a lever mounted therein and adapted to engage shutter operating mechanism, said lever being provided with an angular arm or projection, a rotatable member mounted in said casing and provided with a projection adapted to engage said arm or projection to actuate said lever, and means for rotating said member.

3. A camera attachment comprising a casing, a lever mounted therein and adapted to engage shutter operating mechanism, said lever being provided with an angular arm or projection, means within said casing constructed to engage said arm or projection to actuate said lever, and a locking lever controlling the operation of said engaging means.

4. A camera attachment comprising a casing, a lever mounted therein and adapted to engage shutter operating mechanism, said lever being provided with an angular arm or projection, a rotatable member mounted in said casing and provided with a pin adapted to engage said arm or projection to actuate said lever, means for rotating said member, and a stop lever arranged to engage said pin.

5. A camera attachment comprising a casing, a shutter operating lever pivoted in said casing and provided with an angular portion having a finger projecting therefrom, a spring bearing against said angular portion, and means for engaging said finger to rock said lever against the action of said spring.

6. A camera attachment comprising a casing, a shutter operating lever pivoted in said casing and provided with an angular portion having a finger projecting therefrom, a spring bearing against said angular portion, a rotatable member provided with a lug for engaging said finger to rock said lever against the tension of said spring, and means for rotating said member.

7. A camera attachment comprising a casing, a shutter operating lever pivoted in said casing and provided with an angular portion having a finger projecting therefrom, a spring bearing against said angular portion, means for engaging said finger to rock said lever against the tension of said spring, and a stop lever for controlling the operation of said engaging means.

8. A camera attachment comprising a casing, a shutter operating lever pivoted in said casing and provided with an angular portion having a finger projecting therefrom, a spring bearing against said angular portion, a rotatable member provided with a lug for engaging said finger to rock said lever against the tension of said spring, means for rotating said member, and a stop lever arranged to engage said lug.

9. A camera attachment comprising a casing, a shutter operating lever pivoted in said casing and provided with an angular portion having a finger projecting therefrom, a spring bearing against said angular portion, a rotatable member provided with a lug for engaging said finger to rock said lever against the tension of said spring, means for rotating said member, and a visual indicating device connected with said rotatable member.

10. A camera attachment comprising a casing, a shutter operating lever pivoted in said casing and provided with an angular portion having a finger projecting therefrom, a spring bearing against said angular portion, a shaft mounted in said casing, a pinion mounted on said shaft and having a lug for engaging said finger to rock said lever against the tension of said spring, means for rotating said shaft, and a pointer secured to said shaft.

11. A camera attachment comprising a casing, a shutter operating lever mounted therein, a grooved rail forming a guideway carried by the rear wall of said casing, a clamp having two members, one member slidably mounted in said guideway, and the other member adapted to hold the camera to its support, and means for actuating said lever.

This specification signed and witnessed this twenty-third day of July A. D. 1908.

HERMAN G. KORINKO.
ANTON J. ASP.

Witnesses:
M. TURNER,
A. BECKER.